Figure 1:
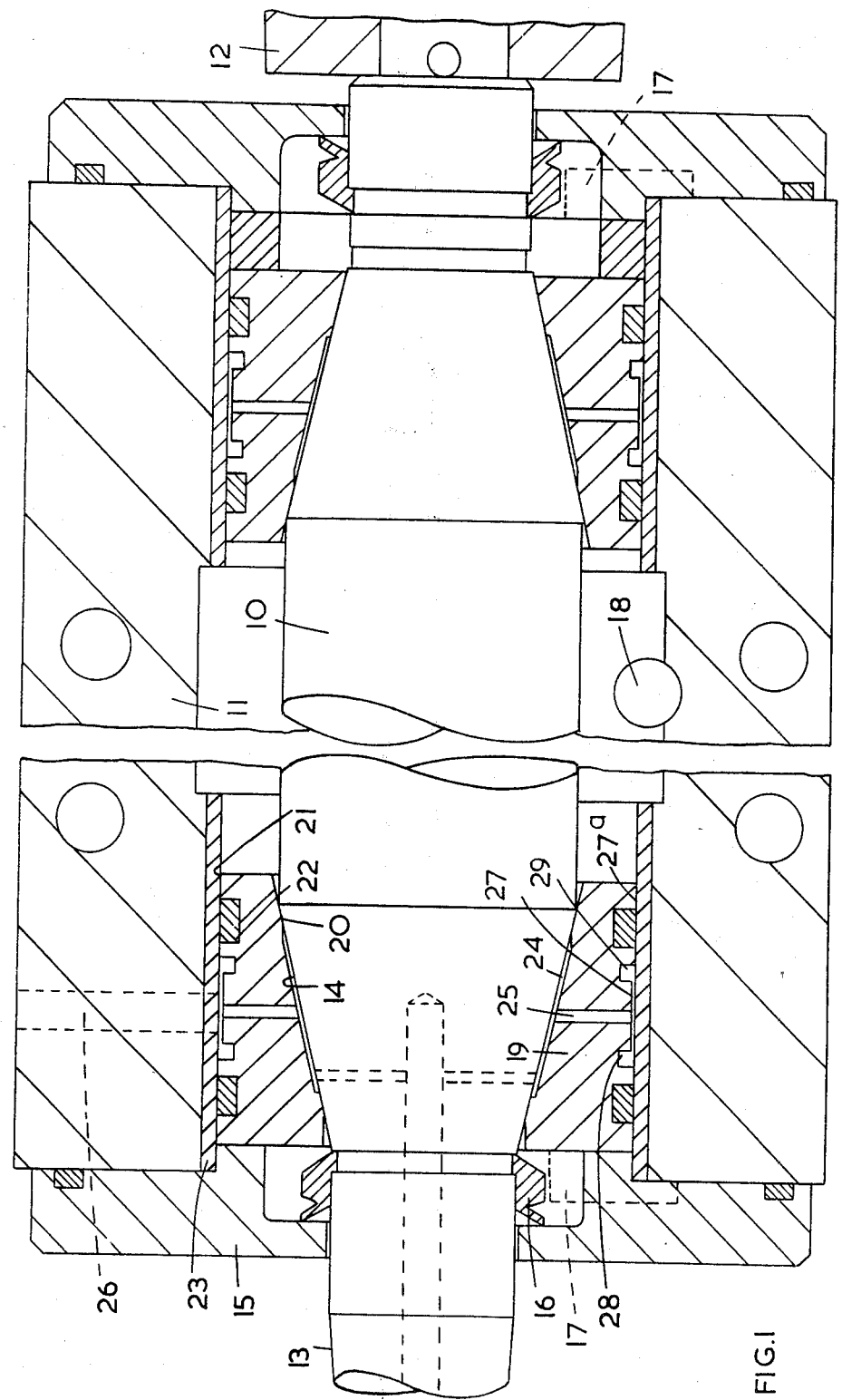

United States Patent [19]
Mason

[11] 3,917,366
[45] Nov. 4, 1975

[54] HYDROSTATIC BEARINGS

[75] Inventor: Peter Alan Mason, Kenilworth, England

[73] Assignee: Wickman Machine Tool Sales Limited, Coventry, England

[22] Filed: Apr. 1, 1974

[21] Appl. No.: 457,472

[30] Foreign Application Priority Data
Apr. 3, 1973 United Kingdom........... 15863/73

[52] U.S. Cl. .............................................. 308/122
[51] Int. Cl.² ................. B61F 17/00; F16C 1/24; F16C 13/02; F16C 33/66
[58] Field of Search ............... 308/122, 121, 124, 78

[56] References Cited
UNITED STATES PATENTS

| | | |
|---|---|---|
| 2,919,960 | 1/1960 | Whitney............................ 308/122 |
| 3,240,541 | 3/1966 | Levesque........................... 308/122 |
| 3,461,752 | 8/1969 | Kielas et al........................ 308/122 |
| 3,674,355 | 7/1972 | Yearout et al..................... 308/122 |

Primary Examiner—Floyd F. King
Attorney, Agent, or Firm—Holman & Stern

[57] ABSTRACT

A hydrostatic bearing with a supply duct and a communicating entry port leading to a pocket in a sleeve and arranged to support a spindle in a body, the communication between the supply duct and the entry port being through a shallow recess with peripheral deeper grooves, the flow of fluid from the supply duct to the entry port being restricted by spacing of the entry port from the grooves.

5 Claims, 5 Drawing Figures

HYDROSTATIC BEARINGS

This invention relates to hydrostatic bearings which are bearings of the kind in which, during running, a cushion of fluid under pressure is maintained in a bearing space between the running surface so that no physical contact takes place between them.

In such a bearing it is well known that the fluid must flow through a restrictor before entering the bearing space. The purpose of this is to maintain upstream of the restrictor a fluid pressure higher than that existing in the bearing space, so that changes in the pressure in the bearing space, in response to changes in load, may be accomodated. Where space or other factors permit the restrictor may be remote from the bearing space and its design may be such that it tends not to become blocked by dirt or foreign matter. However such an arrangement may involve a bulky apparatus involving complexity of manufacture. Where space does not permit this, the restrictor is usually in the form of a small diameter plain hole adjacent to the bearing space and blockage is usually prevented by providing effective filtration prior to feed of the fluid to the hydrostatic bearing.

It is the object of this invention to provide a hydrostatic bearing in a form wherein these disadvantages are substantially eliminated, and the resulting bearing is easier and cheaper to manufacture.

According to the present invention there is provided a hydrostatic bearing between a body and a spindle, the body containing a bearing sleeve which is non-rotatably secured to the body, the sleeve having a plurality of pockets on its face presented to the spindle a cushion of fluid being maintained in use in said pockets, the sleeve having entry ports therethrough affording communication between the pockets and a supply duct for fluid in the body and there being defined between the supply duct and the entry ports a flow restricting means in the form of a shallow recess with which the supply duct communicates, the entry ports communicating with the recess at a position spaced from the supply duct, the recess being bounded by peripheral deeper grooves, and the supply duct communicating with said grooves and the entry ports communicating with the recess at a position spaced from said peripheral grooves.

Figure 2:
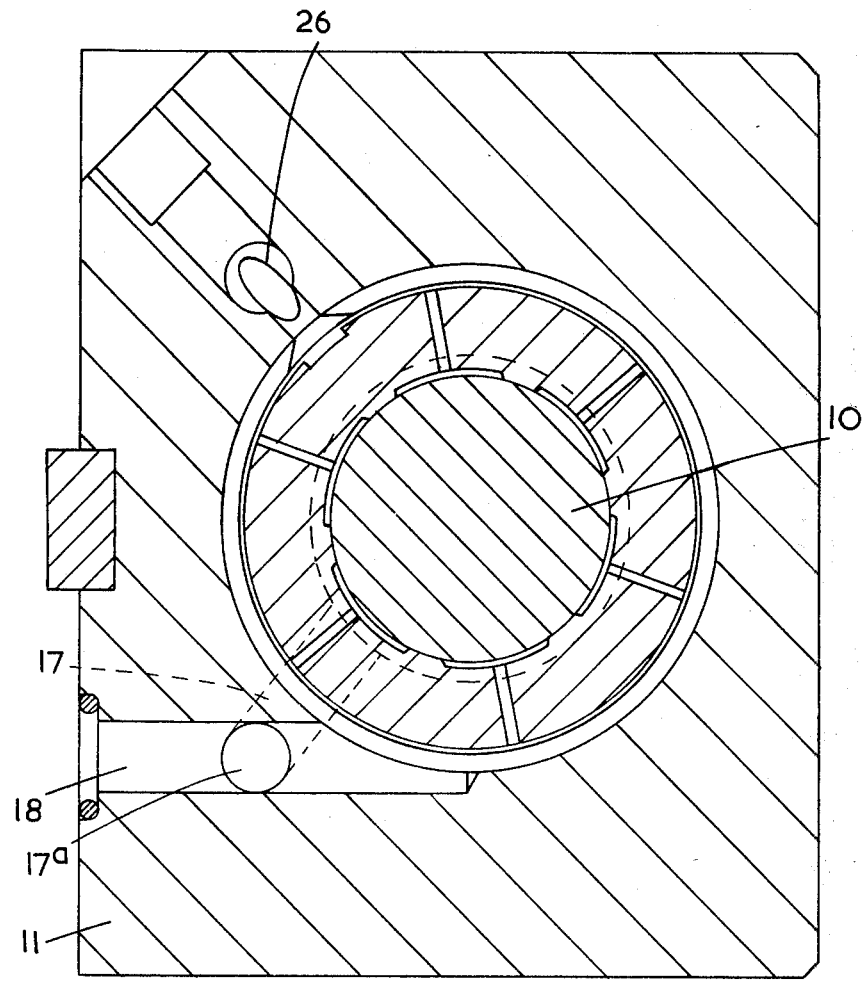
Figure 3:
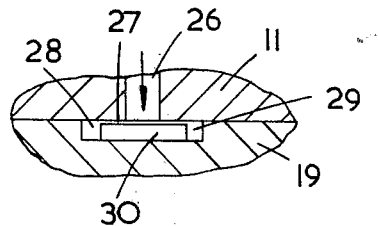
Figure 4:
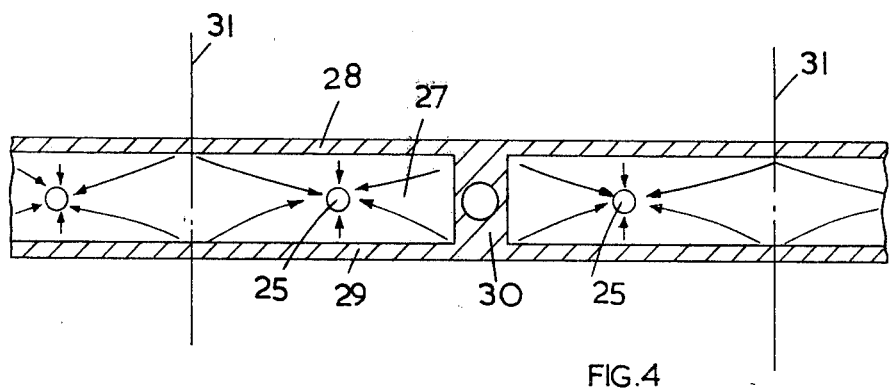
Figure 5:
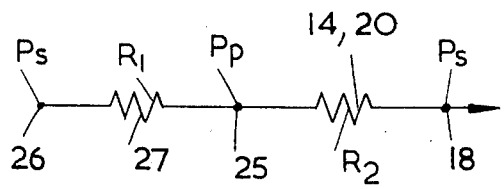

The invention will now be described by way of example with reference to the accompanying drawings in which:

FIG. 1 is a cross sectional view of a spindle mounted in bearings constructed in accordance with the invention, FIG. 2 is a transverse cross-sectional view thereof, FIG. 3 is a fragmentary cross-sectional view showing the supply duct, FIG. 4 is a developed view of the outside of the sleeve of one of the bearings, and FIG. 5 is a diagrammatic representation of the fluid pressure levels in the bearing in use.

In FIG. 1 there is shown a spindle particularly for supporting a grinding wheel. The spindle 10 is mounted in a body 11 in hydro-static bearing assemblies at opposite ends of the body respectively. At one end the spindle 10 carries a pulley 12 for a drive belt and at the other end there is a tapered portion 13 for fitting a grinding wheel or other device.

The bearing assemblies are identical and engage on respective frusto-conical portions 14 of the spindle. They are retained in the body 11 by respective end caps 15 containing seals 16 which are mounted on the spindle. Radial slots 17 in the end caps 15 provide respective drains for the bearing fluid, as will be described. These communicate with a drain duct 18 in the body 11, by way of a drilling 17a. Drainage from the space between the mid region of the spindle bore of the body flows directly into the drain duct 18.

Each hydro-static bearing between the body 11 and the spindle 10 comprises a sleeve 19 having an internal fructo-conical surface 20 and an external cylindrical surface 21. The cylindrical surface 21 has two annular grooves containing respective sealing rings 22 and is a relatively tight fit against a cylindrical shell 23 fixed in the body 11 to provide a liquid tight seal and mechanical support therebetween. Furthermore, it is not intended that relative rotation shall take place between the sleeve 19 and the shell in body 11. The shell is preferably of hard metal such as steel whereas the body is light weight and is preferably of aluminium. Positive means (not illustrated) may be provided for securing the sleeve 19 against rotation in the body 11.

In the frusto-conical surface 20 of the sleeve 19, there are provided a number of angularly spaced shallow elongated pockets 24, in each of which, in use, is maintained a cushion of fluid which spaces the surface 20 of the sleeve 19 from the corresponding surface 14 of the spindle 10.

To supply fluid under pressure to each of the pockets 24, there is a radial drilling 25 in the sleeve 19, this drilling communicating at its inner end, with a pocket 24. The pockets 24 are provided to afford support for the bearing against applied loads in substantially all directions.

The body 11 has a supply duct 26 which has a radial portion opening into the internal surface 27a of the shell 23 in the body. To afford communication between the supply duct 26 and the entry ports 25 in the sleeve 19, there is, in the external surface 21 of the sleeve 19, an annular recess. This recess is disposed between the two seals 22.

The recess however not only provides means for distributing the fluid between all the entry ports 25 but also provides a flow restricting means for the fluid between supply duct and each one of the entry ports 25.

The recess has portions of different depth. The midregion of the recess is shallow as indicated at 27 and at either side of this mid-region there are two deeper portions in the form of peripheral annular grooves 28, 29.

At one position in the recess, the two grooves 28, 29 are joined by an axially extending portion 30 of the same depth as the grooves. It is with this portion 30 that the supply duct 26 communicates as indicated in FIGS. 3 and 4. The supply duct 26, of which there is another in the housing 11, supplies the adjacent bearing and these are fed from a common supply.

The shallow portion 27 of the recess, having in this example a radial depth of approximately 0.001 inches, has at spaced intervals the outer ends of the radial entry ports 25. These are spaced circumferentially from the axially extending portion 30 of greater depth with which the supply duct 26 communicates and they are also spaced in an axial direction from the edges of the shallow portion 27 of the recess, being equally spaced from the two sides of that portion. Arrows in FIG. 4 illustrate the flow paths of fluid from the deeper annular grooves 28, 29 and the portion 30 of the recess, across the shallow portion 27 and into the entry ports 25. Lines 31 indicate zones in which flow is divided between adjacent entry ports 25, such zones 31 being substantially equi-distant from the adjacent entry ports.

FIG. 5 illustrates diagrammatically the pressure levels existing in the fluid circuit. $Ps$ represents the pressure in the supply duct 26. $Pp$ represents the pressure in the entry ports 25 as well as in the pockets 24 and $Pa$ represents the pressure outside the ends of the bearing sleeve and in the drain duct 18.

There are shown two resistances in series. R1 represents the resistance created by the recess shallow portions 27 and R2 represents the resistance created when flow takes place from the pockets 24 between the surfaces 14 and 20 on the spindle and sleeve 19 respectively. This is, in effect, a potentiometer arrangement which tends to maintain steady the intermediate pressure Pp despite changing load conditions upon the bearing.

Though shown applied to conical bearings, the invention may also be applied to cylindrical bearings.

I claim:

1. A hydrostatic bearing between a body and a spindle, the body containing a bearing sleeve which is non-rotatably secured to the body, the sleeve having a plurality of pockets on its face presented to the spindle, a cushion of fluid being maintained in use in said pockets, the sleeve having entry ports therethrough affording communication between the pockets and a supply duct for fluid in the body and there being defined between the supply duct and the entry ports a flow restricting means in the form of a shallow recess with which the supply duct communicates, the entry ports communicating with the recess at a position spaced from the supply duct, the recess being bounded by peripheral deeper grooves, and the supply duct communicating with said grooves and the entry ports communicating with the recess at a position spaced from said peripheral grooves.

2. A bearing as claimed in claim 1 in which the supply duct is in communication with the peripheral deeper grooves and the entry port communicating with the shallow recess at a position spaced from the grooves.

3. A bearing as claimed in claim 1 in which the recess is annular and the grooves bound it at opposite axial sides respectively.

4. A bearing as claimed in claim 3 in which the recess is annular and the entry ports are substantially equally spaced around it, the supply duct being positioned in a portion joining grooves at opposite axial edges of the recess, said portion being of a depth substantially equal to the groove depth.

5. A bearing as claimed in claim 1 in which the bearing sleeve and the corresponding portion of the spindle are frusto-conical.

* * * * *